Figure 10:
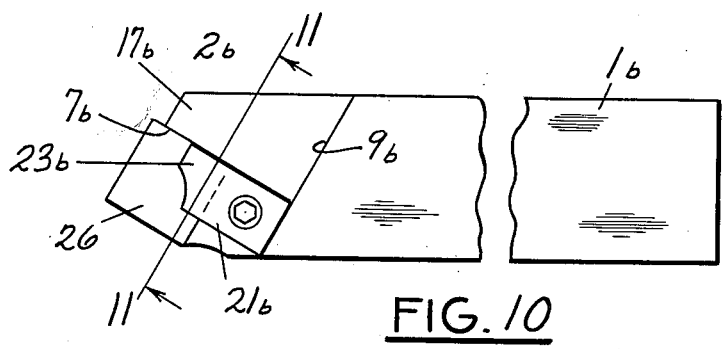

Sept. 24, 1963    W. J. GREENLEAF    3,104,452
CUTTING TOOL
Filed Nov. 28, 1960    2 Sheets-Sheet 1
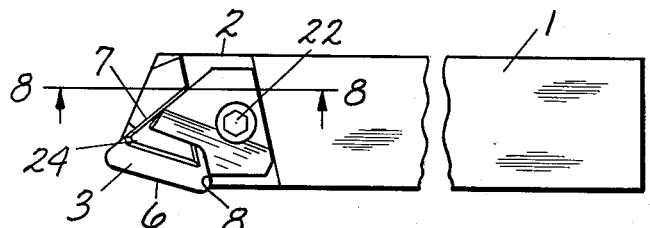
FIG. 1
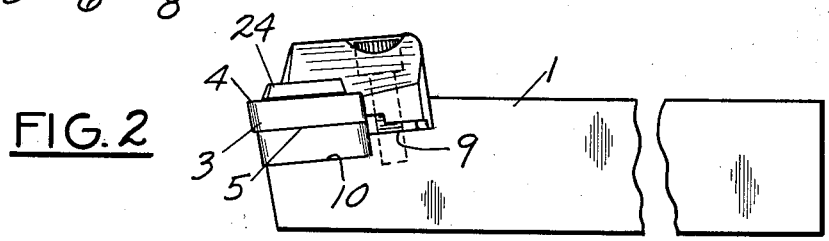
FIG. 2
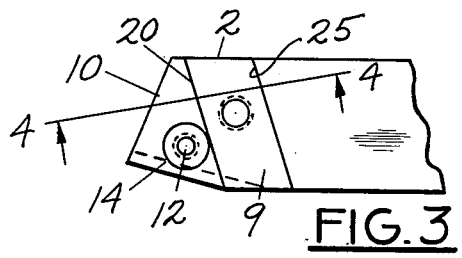
FIG. 3
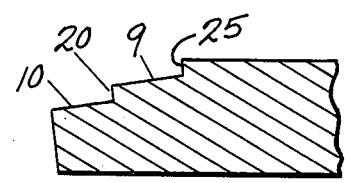
FIG. 4
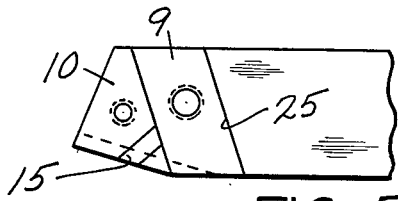
FIG. 5
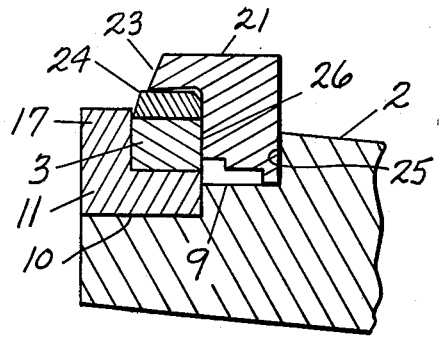
FIG. 8
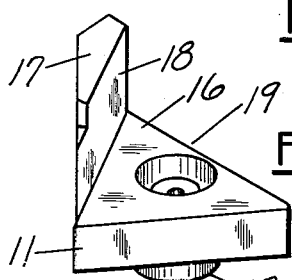
FIG. 6
FIG. 7
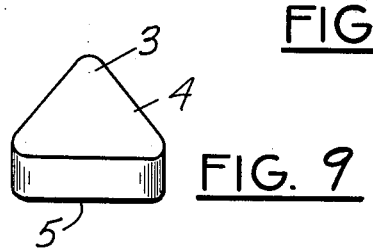
FIG. 9
INVENTOR.
Walter J. Greenleaf
BY Ralph Hammar
Attorney Sept. 24, 1963 W. J. GREENLEAF 3,104,452
CUTTING TOOL
Filed Nov. 28, 1960 2 Sheets-Sheet 2

INVENTOR.
Walter J. Greenleaf
BY Ralph Hammar
Attorney

United States Patent Office 3,104,452
Patented Sept. 24, 1963

3,104,452
CUTTING TOOL
Walter J. Greenleaf, R.D. 3, Meadville, Pa.
Filed Nov. 28, 1960, Ser. No. 72,041
5 Claims. (Cl. 29—96)

This invention is a cutting tool using indexable bits of hard metal such as carbide. The manufacture of the tool is simplified and its service life is increased by providing at the front of the bit holder a replaceable bit seat member with an integral upstanding projection which engages and locates one side of the bit.

Figure 11:
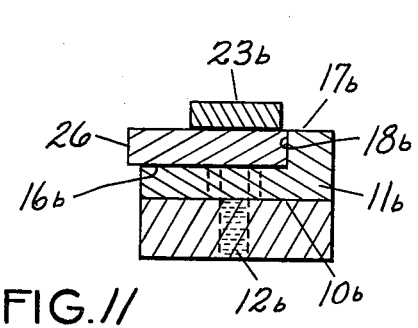
Figure 12:
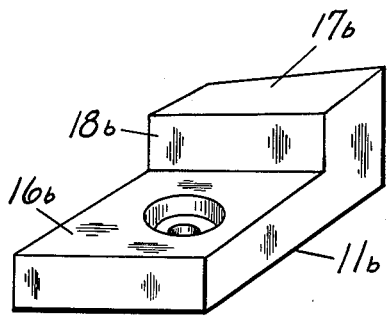
Figure 13:
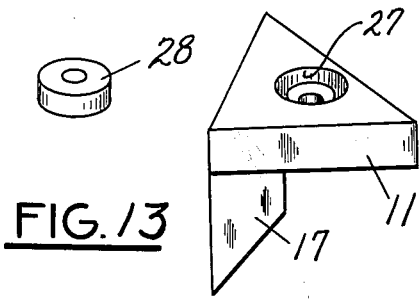
Figure 14:
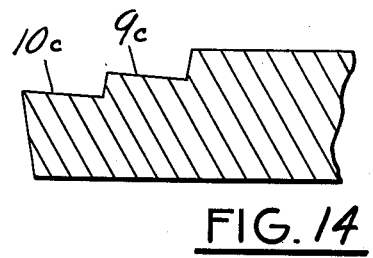
Figure 15:
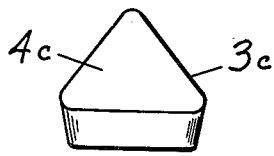

In the drawings:

FIG. 1 is a top plan view of a preferred form of cutting tool;
FIG. 2 is a side view;
FIG. 3 is a top plan of the holder;
FIG. 4 is a section on line 4—4 of FIG. 3;
FIG. 5 is a top plan of a modified form of holder;
FIG. 6 is a perspective of the bit seat member mounted on the front end of the tool of FIGS. 1 to 4 inclusive;
FIG. 7 is a perspective of a bit seat member for use with the holder of FIG. 5;
FIG. 8 is a section on line 8—8 of FIG. 1;
FIG. 9 is a perspective of the bit;
FIG. 10 is a top plan of a cutting tool using a square bit;
FIG. 11 is a section on line 11—11 of FIG. 10;
FIG. 12 is a perspective for the bit seat member of the FIG. 10 tool;
FIG. 13 is a view of an alternative construction for anchoring the bit seat members;
FIG. 14 is a section similar to FIG. 4 of a holder for positive rake bits; and
FIG. 15 is a perspective of a positive rake bit otherwise similar to FIG. 9.

In a preferred form of tool shown in the drawing, which is similar to Patent 2,791,825, the tool has a body 1 for attachment to a machine tool and a head 2 at the front end of the body for supporting an indexable carbide bit 3 of triangular cross section. In the specific bit shown where the top and bottom end faces are perpendicular to the sides, the bit may be indexed to six different cutting positions in each of which the cutting edge has the same relation to the tool so that as the bit is indexed to bring a fresh cutting edge into cutting position, no adjustment need be made in the position of the tool. Because the bits are short or thin, it is economical to throw the bits away after all six cutting edges have been used, although it is possible to sharpen used bits by grinding the top and bottom end faces 4 and 5 in a surface grinder. In the cutting position illustrated in FIG. 1, one side 6 of the bit is at the front and toward one side of the head while the other two sides 7 and 8 converge toward the opposite side of the head. It is important that the bits be accurately supported and precisely located in order to prevent variation in the cuts as the bits are indexed.

At the front of the head 2 are two steps 9 and 10 extending crosswise of the head from one side to the other. Both steps are unobstructed toward the front of the head. The steps may conveniently be made at the same time in a single milling operation with two cutters ganged so that each cutter forms one of the steps. A number of the bodies 1 may be mounted side by side on the milling machine so that the milling operation will form the steps in a group of bodies at each set-up. On the lower of the steps 10, the step at the extreme front of the head, is a bit seat member 11 fastened to the step by a screw in tapped hole 12. Concentric with the hole 12 is a circular keying projection 13 on the underside of the bit seat member which fits in a recess 14 in the step 10. An alternate form of bit seat member 11a is illustrated in FIG. 7 for use with the tool of FIG. 5. The only difference in the bit seat member 11a is in the keying projection 13a which is of rectangular section and fits in a complementary groove 15 in the step. With either construction, the bit seat member is solidly fastened to the step 10. On the upper surfaces of each of the bit seat members is a flat seating surface 16 for the bottom end face 5 of the bit. Integral with the front of the bit seat members is an upstanding projection 17 having a surface 18 engaging and locating the side 7 of the bit. The bit seat members 11 and 11a can be made of hard metal, harder than is practical for the body of the tool, and the surfaces 16 and 18 can be simultaneously ground to the required degree of flatness and in the proper angular relation to each other. The grinding is done while the bottom surface of the bit seat members rest on a surface corresponding to the step 10 and the back edge 19 of the bit seat members is located against a surface corresponding to the locating shoulder or riser 20 between steps 9 and 10 for the bit seat member. This insures precise location of the surfaces 16 and 18 with respect to the parts on which the bit seat members are to be assembled. The grinding of the surfaces 16 and 18 is very easily carried out because of the absence of obstructions which would interfere with the passes of a grinding wheel.

Not only does the bit seat construction provide for accurate location of the bits, but it permits easy replacement of the bit seats in case of breakage.

On the step 9 is a clamp 21 fastened to the head by a screw 22 and having a nose 23 projecting out over the top end surface 4 of the bit. In the particular construction illustrated, there is a chip breaker 24 between the bit and the nose 23 of the clamp but in many tools the chip breaker is omitted. The back edge of the clamp is located by a shoulder or riser 25 at the rear of step 9. At the front of the clamp is a shoulder 26 engaging side 8 of the bit and cooperating with the surface 18 to locate the bit. The shoulder 26 and the surface 18 also locate the chip breaker 24.

In the use of the tool, the cutting thrust is downward against the top end surface 4 of the bit and inward against the side 6 of the bit. The downward thrust is taken through the bit seat member 11 to the step 10 on the head. The inward thrust is divided between the surface 18 on the bit seat member and the surface or shoulder 26 on the clamp.

The principal differences between the tool shown in FIGS. 10, 11 and 12 and the tool shown in FIGS. 1 to 9 inclusive is in the shape of the bit and the corresponding changes in the angle of the steps and in the shape of the bit clamp. Because of this similarity, corresponding parts will be designated by the same reference numerals with the subscript "b." The clamp 21b is seated on step 9b and has a nose 23b extending out over the square indexable bit 26. The clamp has the same provisions for engaging and locating one edge of the bit as the clamp 21. The clamp holds the bit down against a flat seating surface 16b on a bit seat member 11b having an upstanding projection 17b with a vertical surface 18b for engaging and locating the side 7b of the bit. The bit seat member 11b is fastened to the step 10b by a screw in tapped hole 12b.

In FIG. 13 is shown a construction for keying the bit seat member to the holder which may be used with any of the bit seats. It is shown in connection with the bit seat member 11. Instead of providing an integral circular keying projection on the underside of the bit seat member as illustrated in FIG. 6, a recessed hole 27 concentric with the tapped hole 12 is provided on the underside of the bit seat member and a ring 28 is inserted in the hole. The axial length of the ring 28 is greater than the depth of the hole 27 so that a part of the ring 28 projects below the bottom surface of the bit seat member in the same manner as the projection 13. The construction of FIG. 13 simplifies the manufacture of the bit seat members. Since the entire bottom surface of the bit seat member is flat, it can be easily surface ground to match the step 10. The ring 28 is not inserted until after the grinding.

By appropriate changes in shape, the tool is adapted to positive rake bits as well as the negative rake bits so far described. FIG. 14 is a sectional view similar to FIG. 4 showing the inclination of the steps 9c and 10c for positive rake bits such as the triangular bit 3c illustrated in FIG. 15. In this bit, the edges are not at right angles to the end faces but are inclined at an acute angle to the top end face 4c thereby providing a positive rake. The positive rake bit may be indexed by turning about its axis but cannot be turned end for end.

What is claimed as new is:

1. In a cutting tool having a head for carrying an indexable throw away bit of triangular cross section and of length less than any other dimension and with its longitudinal axis extending in the general direction of the cutting thrust, said head having at its front end a step extending from one side toward the opposite side of the head, said step being unobstructed toward the front and with a riser toward the rear of the head, a bit seat member having a flat seating surface adjacent the front and at one side of the head and an integral upstanding portion adjacent the front and the other side of the head, an indexable triangular bit having a bottom end face resting on the seating surface with the top end face and one side of the bit in cutting position and the other two sides inactive, said upstanding portion of the bit seat member engaging one of the inactive sides of the bit, means for attaching the bit seat member to the step, and a clamp having a projection extending out over the top end face of the bit for clamping the bit against said seating surface, said clamp having a shoulder engaging the other of the inactive sides of the bit, the angle between the shoulder on the clamp and said surface of the upstanding portion of the bit seat member being the same as the angle between said inactive sides of the bit.

2. In a cutting tool having a head for carrying an indexable throw away bit of triangular cross section and of length less than any other dimension and with its longitudinal axis extending in the general direction of the cutting thrust, said head having two steps extending across the front of the head from one side to the opposite side with the lower step in front of the other step and unobstructed toward the front of the head, a bit seat member on the lower step and having a flat seating surface adjacent the front and open toward one side and toward the rear of the head and an integral upstanding portion adjacent the front and the opposite side of the head, an indexable triangular bit having a bottom end face resting on the seating surface with one side of the bit in cutting position at said one side of the head and with another side engaging said upstanding portion, a clamp on the other of the steps having a projection extending out over the top end face of the bit to clamp the bit against said seating surface, said clamp having a surface engaging the remaining side of the bit, the angle between said surface on the clamp and the upstanding portion of the bit seat member being the same as the angle between adjacent sides of the bit, and means fastening the clamp to the head.

3. In a cutting tool having a head for carrying an indexable throw away bit of polygonal cross section and of length less than any other dimension and with its longitudinal axis extending in the general direction of the cutting thrust, said head having a step extending across the front of the head from one side to the opposite side, a bit seat member on the step and having a flat seating surface adjacent the front of the head and open toward one side and toward the rear of the head and an integral upstanding portion adjacent the front and the opposite side of the head, means fastening the bit seat member to the step, an indexable polygonal bit having a bottom end face resting on the seating surface with one side of the bit in cutting position and with another side engaging said upstanding portion, and means for clamping the bit against said seating surface.

4. In a cutting tool having a head for carrying an indexable throw away bit of polygonal cross section and of length less than any other dimension and with its longitudinal axis extending in the general direction of the cutting thrust, said head having at its front end a step extending from one side to the opposite side of the head, a bit seat member at the front of the head having a flat seating surface adjacent the front of the head and open toward one side and toward the rear of the head and an integral upstanding portion adjacent the front and the opposite side of the head, an indexable polygonal bit having a bottom end face resting on the seating surface with the top end face and one side of the bit in cutting position and at said one side of the head and with the other sides inactive, one of the inactive sides of the bit engaging said upstanding portion of the bit seat member, means for attaching the bit seat member to the step, and means for clamping the bit against said seating surface.

5. In a cutting tool having a head for carrying an indexable throw away bit of polygonal cross section and of length less than any other dimension and with its longitudinal axis extending in the general direction of the cutting thrust, said head having a surface for receiving the cutting thrust extending across the head from one side to the opposite side and unobstructed toward the front of the head, a bit seat member having a flat seating surface adjacent the front of the head and open toward said one side and toward the opposite side of the head and an integral upstanding portion adjacent the front and the opposite side of the head provided with locating means for one side of a bit, means for non rotatably fastening the bit seat member to the head and against said surface, locating means on said head for another side of a bit, an indexable polygonal bit having a bottom end face resting on the seating surface of the bit seat member with one side of the bit in cutting position and with two other sides of the bit engaging said locating means on said head and on said upstanding portion of the bit seat member, and means for clamping the bit against said seating surface.

References Cited in the file of this patent
UNITED STATES PATENTS

| | | |
|---|---|---|
| 2,791,824 | Greenleaf | May 14, 1957 |
| 2,982,008 | Facknitz | May 2, 1961 |